United States Patent
Rumala

(10) Patent No.: US 10,323,934 B1
(45) Date of Patent: Jun. 18, 2019

(54) OPTICAL PROTRACTOR TO MEASURE ROLL ANGLE ON A STATIC SURFACE AND ROTATING SURFACE

(71) Applicant: NORTHROP GRUMMAN SYSTEMS CORPORATION, Falls Church, VA (US)

(72) Inventor: Yisa S. Rumala, New York, NY (US)

(73) Assignee: Northrop Grumman Systems Corporation, Falls Church, VA (US)

(*) Notice: Subject to any disclaimer, the term of this patent is extended or adjusted under 35 U.S.C. 154(b) by 0 days.

(21) Appl. No.: 15/943,240

(22) Filed: Apr. 2, 2018

(51) Int. Cl.
*G01B 11/26* (2006.01)

(52) U.S. Cl.
CPC ..................... *G01B 11/26* (2013.01)

(58) Field of Classification Search
CPC ......... G01B 11/26; H01S 3/0804; H01S 3/03; H01S 3/061; H01S 3/0805; H01S 3/08068; H01S 3/082; H01S 3/083; H01S 3/0941; H01S 3/10076; H01S 3/2232; H01S 2301/20
USPC ................................................ 356/138, 328
See application file for complete search history.

(56) References Cited

U.S. PATENT DOCUMENTS

| | | | |
|---|---|---|---|
| 3,790,284 A | 2/1974 | Baldwin | |
| 4,559,627 A * | 12/1985 | Chun | H01S 3/0606 372/103 |
| 5,283,796 A * | 2/1994 | Fink | H01S 3/105 372/19 |
| 5,734,165 A * | 3/1998 | Unal | G01J 3/28 250/338.1 |
| 6,134,259 A * | 10/2000 | Danziger | H01S 3/0804 307/3 |
| 6,813,286 B1 * | 11/2004 | Danziger | H01S 3/0804 372/18 |
| 6,954,990 B2 | 10/2005 | Ellis | |
| 9,146,155 B2 * | 9/2015 | Ko | G01J 3/02 |
| 9,423,360 B1 * | 8/2016 | Kostamo | G01N 21/958 |

(Continued)

OTHER PUBLICATIONS

Fickler, Robert, Lapkiewicz, Radek, Plick, William N., Krenn, Mario, Schaeff, Christoph, Ramelow, Sven, Zeilinger, Anton; "Quantum Entanglement of High Angular Momenta"; Nov. 2, 2012; vol. 338; www.sciencemag.org; pp. 640-643.

(Continued)

*Primary Examiner* — Isiaka O Akanbi
(74) *Attorney, Agent, or Firm* — John A. Miller; Shumaker, Loop & Kendrick, LLP

(57) ABSTRACT

An optical protractor that employs a spiral phase plate resonator (SPPR) device for measuring a roll angle between two points on a static surface or a rotating surface. The protractor includes a tunable laser source that generates a laser beam. The SPPR device is responsive to the laser beam, and includes opposing reflective surfaces that reflect the beam back and forth in the device, where one of the reflective surfaces includes a spiral step index that causes multiple reflected beams having different phases to be combined as an output beam from the device having an optical vortex intensity pattern defined by the phases of the multiple beams, and where the intensity pattern includes radial light intensity lines. The protractor includes a lens that projects the output beam onto the element and the intensity pattern is detected to measure the roll angle.

20 Claims, 4 Drawing Sheets

(56) References Cited

U.S. PATENT DOCUMENTS 10,218,145 B1\* 2/2019 Lin ..................... H01S 3/10053

OTHER PUBLICATIONS

Rumala, Yisa S.; "Wave transfer matrix for a spiral phase plate"; vol. 54, No. 25; May 10, 2015; Applied Optics; 1559-128X/15/144395-08.

Rumala, Yisa S.; "Sensitivity in frequency dependent angular rotation of optical vortices"; vol. 55, No. 8; May 10, 2016; Applied Optics; 1559-128X/16/082024-10.

Forbes, Andrew, Dudley, Angela, McLaren, Melanie; "Creation and detection of optical modes with spatial light modulators"; vol. 8, No. 2; Jun. 2016; Advances in Optics and Photonics.

Rumala, Yisa S., Leanhardt, Aaron E.; "Multiple-beam interference in a spiral phase plate"; vol. 30, No. 3; Mar. 2013; J. Opt. Soc. Am. B; 0740-3224/13/030615-07.

Rumala, Yisa S.; "Interference theory of multiple optical vortex states in spiral phase plate etalon: thick-plate and thin-plate approximation"; vol. 31, No. 6; Jun. 2014; Journal of the Optical Society of America B; 0740-3224/13/030615-07.

Rumala, Yisa S., Leanhardt, Aaron E.; "Optical vortex with a small core and Gaussian intensity envelope for light-matter interaction"; vol. 34, No. 5; May 2017; Journal of the Optical Society of America B; 0740-3224/17/050909-10.

D'Ambrosio, Vincenzo; Spagnolo, Nicolo, Del Re, Lorenzo, Slussarenko, Sergei, Li, Ying, Kwek, Leong Chuan, Marrucci, Lorenzo, Walborn, Stephen P., Aolita, Leandro, Sciarrino, Fabio; Photonic polarization gears for ultra-sensitive angula measurements; Nature Communications; 4:2432; DOI: 10.1038/ncomms3432; www.nature.com/naturecommunications; Published Sep. 18, 2013.

Rumala, Yisa S.; "Propagation of structured light beams after multiple reflections in a spiral phase plate"; Optical Engineering; http://opticalengineering.spiedigitallibrary.org/; Nov. 2015; vol. 54.

Zhou, Hailong; Fu, Dongzhi; Dong, Jianji; Zhang, Pei; Zhang, Xinliang; "Theoretical analysis and experimental verification on optical rotational Doppler effect"; Optical Society of America; vol. 24, No. 9 DOI:10.1364/OE.24.010050 Optics Express 10050; published Apr. 28, 2016.

Zhao, Mingyang; Gao, Xinlu; Xie, Mutong; Zhai, Wensheng; Xu, Wenjing; Huang, Shanguo, Gu, Wanyi; "Measurement of the rotational Doppler frequency shift of a spinning object using a radio frequency orbital angular momentum beam"; 2016 Optical Society of America; vol. 41, No. 11 / Jun. 1, 2016 / Optics Letters p. 2549; Doc. ID 261469; corresponding author: shghuang@bupt.edu.cn; published May 25, 2016.

Lavery, Martin P.J.; Barnett, Stephen M.; Speirits, Fiona C.; Padgett, Miles J.; "Observation of the rotational Doppler shift of a white-light, orbital-angular-momentum-carrying beam backscattered from a rotating body"; corresponding author: martin.lavery©glasgow.ac.uk; 2014 Optical Society of America; vol. 1 No. 1 / Jul. 2014 / Optica; 2334-2536/14/010001-04$15.00; Doc ID 210521; published Jul. 22, 2014.

Fickler Robert; Campbell, Geoff; Buchler, Ben; Lam, Ping Koy; Zellinger, Anton; "Quantum entanglement of angular momentum status with quantum numbers up to 10.010"; Nov. 29, 2016; 13642-13647; vol. 113 No. 48; PNAS; www.pnas.org/cgi/doi/10.1073/pnas.1616889113.

\* cited by examiner

OPTICAL PROTRACTOR TO MEASURE ROLL ANGLE ON A STATIC SURFACE AND ROTATING SURFACE

BACKGROUND

Field

The present disclosure relates generally to an optical protractor for measuring a roll angle between two points on a surface and, more particularly, to an optical protractor for measuring a roll angle between two points on a static or rotating surface, where the protractor employs a spiral phase plate resonator (SPPR) device that generates an optical vortex intensity pattern that is projected onto the surface.

Discussion

The manufacture and production of various parts, tools and systems, such as large aerospace system parts, 3D printing, lithography, sample part fabrication, etc., often requires the measurement of a roll angle on a static or rotating surface. For example, when constructing precision parts, such as quantifying the number of turns during production of narrow-band optical filters at telecom wavelengths, it is often necessary to know the rotation rate of the optical filter.

Roll angles are typically measured by placing the part on a rotatable mount that includes built-in angular ticks along its circumference, and then rotating the mount to determine the roll angle of the part. This technique usually works well when building small parts, but can be challenging when fabricating large or very heavy aerospace system parts. Another known roll angle measuring technique includes placing a mechanical protractor on the part to determine the angle of interest between two fiducials. For this technique, the mechanical protractor would be in contact with the surface to determine the roll angle, which could be detrimental for applications requiring a non-contact measure of the roll angle. In order to measure increasingly smaller angles in confined spaces, the radius of the protractor would have to be made larger (more angular ticks) or gears would be required on the mechanical protractor to amplify the precision of the angle being measured. This could easily increase the size of the mechanical protractor for high precision measurements, and thus be problematic when measuring angles in confined spaces. This task becomes even more challenging when measuring angles on curved surfaces. Furthermore, some applications in 3D printing, lithography and part fabrication in clean room environments require a non-contact determination of roll angle, where the mechanical protractor would be in contact with the part that is being measured. If the surface is rotating at a constant rate, the roll angle and rotation rate cannot be deduced with a mechanical protractor.

Optical systems may provide the ability for making non-contact measurements of roll angle between two static points or lines on a surface, even when the surface is curved and/or rough. If the surface is rotating, the rotation rate of the surface can be deduced in addition to the roll angle. In particular, by using a coherent superposition of optical vortices that has built-in cylindrical symmetry, non-contact measurements of roll angle can be made to very high accuracy and precision. A property of a coherent superposition of optical vortices is that it forms a periodic intensity modulation as a function of roll angle (azimuthal angle), which can be projected on the surface for which the angle is being measured and sensed with a detector.

Various methods exist in the art to create a coherent superposition of optical vortices, including methods that use spatial light modulators, spiral phase plates in an interferometer, spiral phase mirrors in an interferometer, etc. However, these methods do not allow for controlling the roll angle of the optical vortex without causing a mechanical rotation of select parts of the optical system that limits the resolution, or the optical system consists of a complex arrangements of optical elements including motorized stages, i.e., for the case of spiral mirrors, q-plates, spiral phase plates, etc. For those methods that employ a spatial light modulator (SLM), a computer is required to control the SLM and its resolution in the generation of angular displacement is limited by the SLM screen being pixelated and the finite range of the phase change of the SLM. With these challenges, there is no clear way to miniaturize the system, while maximizing the precision of the angle measurement without further complicating the optical system design.

A resonator based on a spiral phase plate, i.e., a spiral phase plate resonator (SPPR) device, is a miniaturized optical element for which a coherent superposition of optical vortices can be generated by either reflecting light off of the device or transmitting light through the device. There have been fundamental scientific studies showing a resonator effect for a low reflectivity SPPR device. There have also been studies of a rotation sensor based on the rotational Doppler shift. However, there is yet to be a demonstration in the art of a full optical protractor system for technological applications, such as manufacturing and production, or determining the roll angle with respect to a fiducial in aerospace systems or otherwise.

SUMMARY

The following discussion discloses and describes an optical protractor that employs a spiral phase plate resonator (SPPR) device for measuring a roll angle between two points on a static surface or a rotating surface. The protractor includes a tunable laser source that generates a laser beam and an optical component responsive to and converting the laser beam to a single mode laser beam. The SPPR device receives the single mode laser beam, and includes opposing reflective surfaces that reflect the beam back and forth in the device. One of the reflective surfaces includes a spiral step index that causes multiple reflected beams having different phases to be combined as an output beam from the device having an optical vortex intensity pattern, where the intensity pattern includes radial light intensity lines. The protractor includes a lens that projects the output beam onto the element, a detector for detecting light reflected from the element and a processor responsive to signals from the detector. The processor generates images of the reflected light that include the optical vortex intensity pattern projected onto the element, and causes the laser source to change the frequency of the laser beam so that one of the intensity lines aligns with a first one of the points. The processor then causes the laser source to again change the frequency of the laser beam so that the one intensity line aligns with a second one of the points, where a difference between the frequencies of the laser beam is used to determine the angle between the points.

Additional features of the disclosure will become apparent from the following description and appended claims, taken in conjunction with the accompanying drawings.

DETAILED DESCRIPTION OF THE EMBODIMENTS

Figure 1:
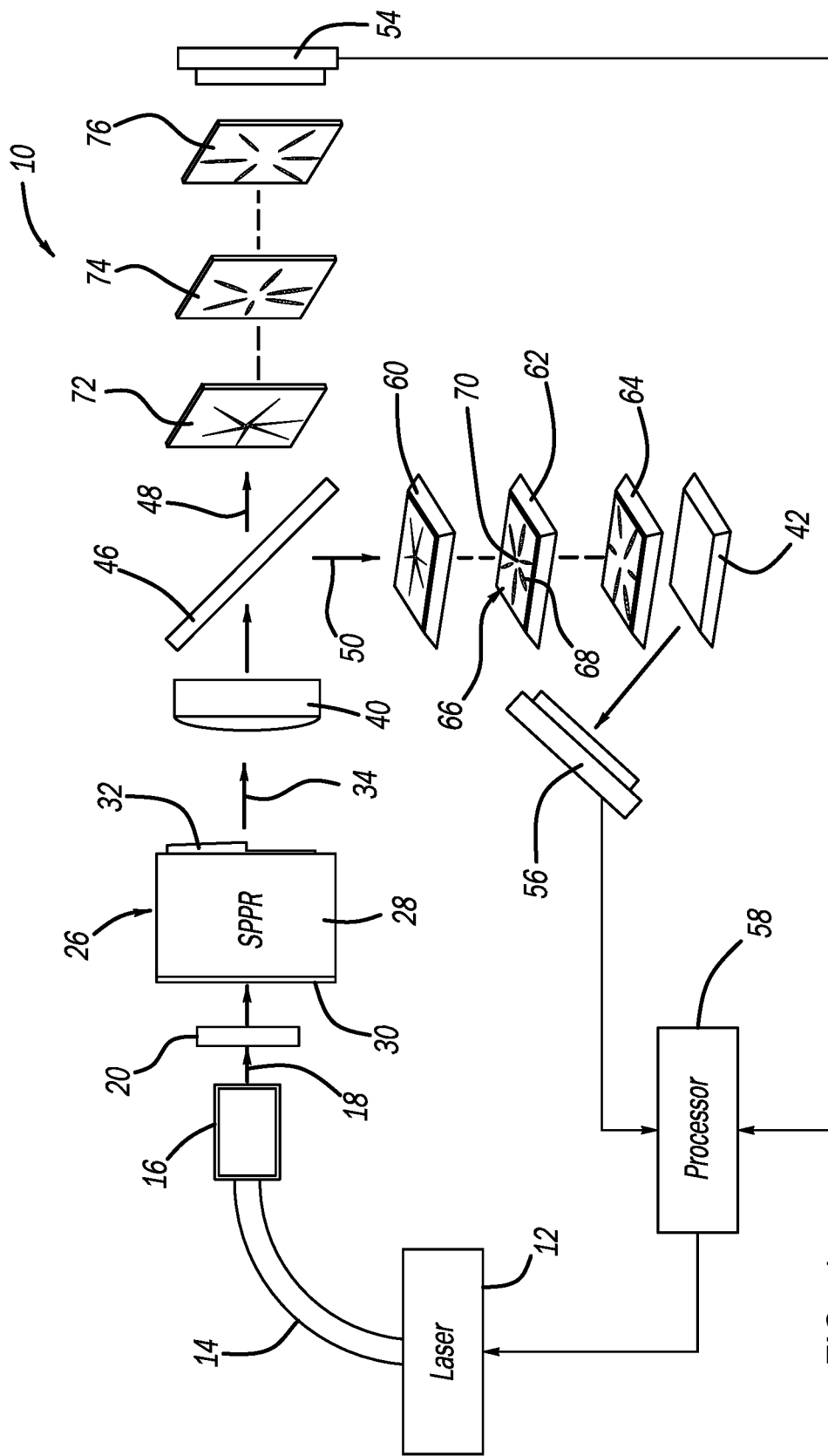
FIG. 1 is a schematic block diagram of an optical protractor for measuring a roll angle between two points on a static surface or a rotating surface.

The following discussion of the embodiments of the disclosure directed to an optical protractor including an SPPR device for measuring a roll angle between points on an element is merely exemplary in nature and is in no way intended to limit the disclosure or its applications or uses.

As will be discussed in detail below, the present disclosure describes an optical system, or optical protractor, that provides an "all optical" process with no moving parts for measuring the roll angle or rotation rate of a static or rotating surface. The optical system has application for the manufacture and production of various components and parts, such as for unmanned aerial vehicles, planes, aircraft carriers, ballistic missiles, etc., where a non-contact measurement of roll angle of a part is important, as well as for angle determination with respect to a fiducial in aerospace systems. The optical system also has machine vision applications, such as in robots and autonomous vehicles, to determine the angle between fiducials during pattern recognition.

The key element of the optical system is a spiral phase plate resonator (SPPR) device in which a light beam at a certain frequency undergoes multiple reflected round trips within the device to create an output beam having an angular intensity modulation interference pattern as a function of beam roll angle. Precise changes of the wavelength of the beam entering the SPPR device rotate angular intensity peaks in the pattern of the beam output from the SPPR device that when projected onto a static surface can be detected to measure the angle between fiducial lines on the surface. By scattering the optical vortex states of the output beam from the SPPR device off of a rotating surface, and analyzing the detected power spectra, the rotation rate of the surface can also be determined.

The intensity modulation interference pattern in the output beam is the result of a coherent superposition of select optical vortex winding numbers emerging from the SPPR device. Because the SPPR device is essentially a resonator, variations in the frequency of the beam causes the intensity pattern to rotate as a function of roll angle of the beam, which is unlike previous schemes that required movable parts and/or possibly polarization optics to generate a rotation of the intensity pattern. By using conventional off the shelf (COTS) optics, the intensity pattern can be projected on a surface of interest in which a non-contact determination of roll angle is performed. Different surfaces would have different geometric properties, where some surfaces could be flat and other surfaces could have a slight curvature. The properties of the emergent optical vortex beam from the SPPR device could be adjusted to match the surface for which the angle is to be measured. Such system properties include controlling the beam size, vortex core size, and the width or shape of the intensity peaks in the interference pattern without changing the number of the intensity peaks.

The roll angle can also be determined when the surface is rotating. More particularly, the SPPR device generates optical vortex states with a coherent superposition of winding numbers so that the system can be used as a rotation sensor. The physical effect of the rotation sensor is based on the rotational Doppler shift. By scattering light containing the optical vortex states off of the rotating surface, and analyzing the power spectra of the backscattered light from the rotating surface, the rotation rate of the surface can also be determined. The roll angle of the rotating surface can be determined from the rotation rate of the surface and the time elapsed during the rotation rate measurement. As this effect is independent of the wavelength of light, long distance remote sensing of the rotation rates can be determined regardless of the orientation (and rotation) of the angular intensity pattern emerging from the SPPR device or the linear Doppler shift complicating interpretation of the results. Previous schemes to determine rotation rate utilizing the rotational Doppler shift at optical frequencies relied on SLMs. Since SLMs have a lower damage threshold than SPPR devices, schemes that make use of SLMs are limited for industrial applications that require determination of the rotation rate at long distances.

To ensure high accuracy of the roll angle that is being measured even under harsh environments, such as the presence of vibrations and temperature gradients, a method for calibrating the optical system is necessary. The method includes calibrating the rotation angle of the optical vortex intensity pattern to the wavelength of the beam, and monitoring the angular displacement of the optical intensity pattern on a detector, such as a CCD camera, with a reference beam. Any spurious changes in the optical system, such as changes in the wavelength of the beam from the laser source, changes in refractive index of the optics, or vibrations of the surface that is being measured, can be compensated during measurement of the roll angle on the surface. The images from the CCD camera are read in real time using image processing algorithms that have reduced errors when finding the center of optical vortices and other forms of systematic errors in the determination of roll angle. The frequency of the input beam to the SPPR device is locked and varied using standard techniques, such as phase locking schemes, amplitude locking schemes, etc., and increments of the frequency would rotate the intensity pattern for measurement, calibration and real time monitoring.

FIG. 1 is a schematic block diagram of an optical system 10 of the type discussed above for determining the roll angle between fiducial lines on a static or rotating surface, and determining the rotation rate of the rotating surface. The system 10 includes a narrow linewidth laser source 12 that is tunable, and that emits a coherent laser beam, for example, in the visible-IR frequency range, into a single mode optical fiber 14 that provides a laser beam 18 in, for example, the $TEM_{00}$ Gaussian mode. In an alternate embodiment, other optical elements instead of the single mode optical fiber 14 can be employed to provide the $TEM_{00}$ Gaussian mode. For example, an appropriately designed aperture (not shown) could be used to put the beam 18 in the $TEM_{00}$ Gaussian mode or clean up the optical mode. The beam 18 emitted from the fiber 14 is collimated by a collimator 16 positioned at the end of the fiber 14 to ensure that the beam 18 propagates through the entire optical system 10 with minimal divergence. Light reflected back into the laser source 12 may cause beam jitter in the laser cavity causing intensity fluctuations of the output laser beam 18 or spurious frequency shifts in the laser wavelength, which could cause instability of the modes in the laser cavity and cause the laser source 12 to go out of lock. Therefore, an optical isolator 20 is positioned after the output of the collimator 16 to prevent back reflection of the laser beam 18 into the laser source 12.

Figure 2:
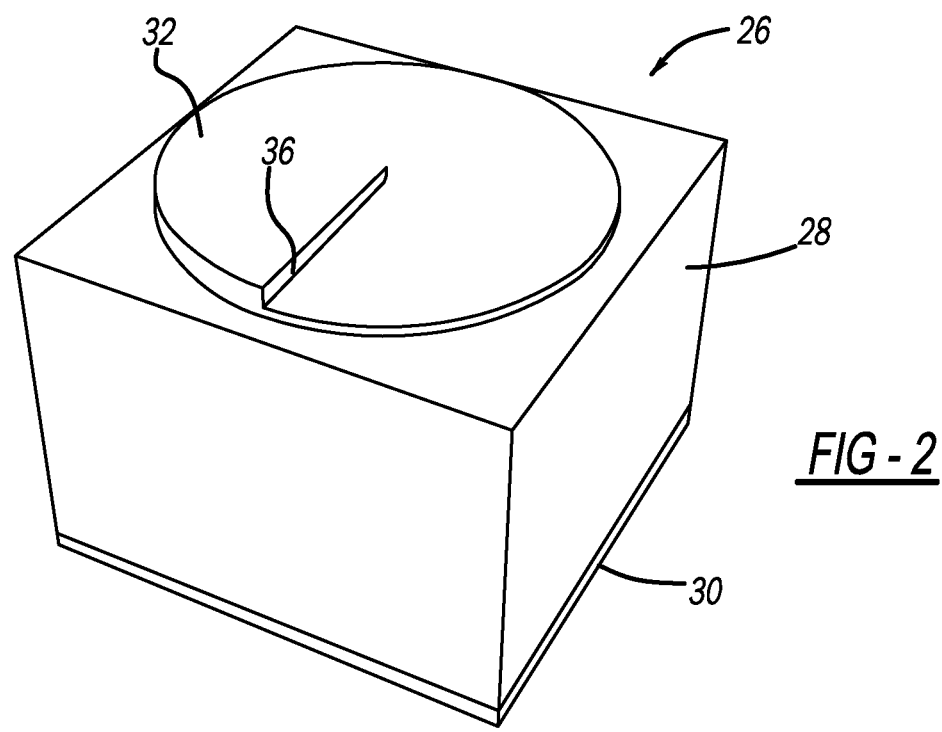
FIG. 2 is an isometric view of a spiral phase plate resonator (SPPR) device separated from the optical protractor shown in FIG. 1.
Figure 3:
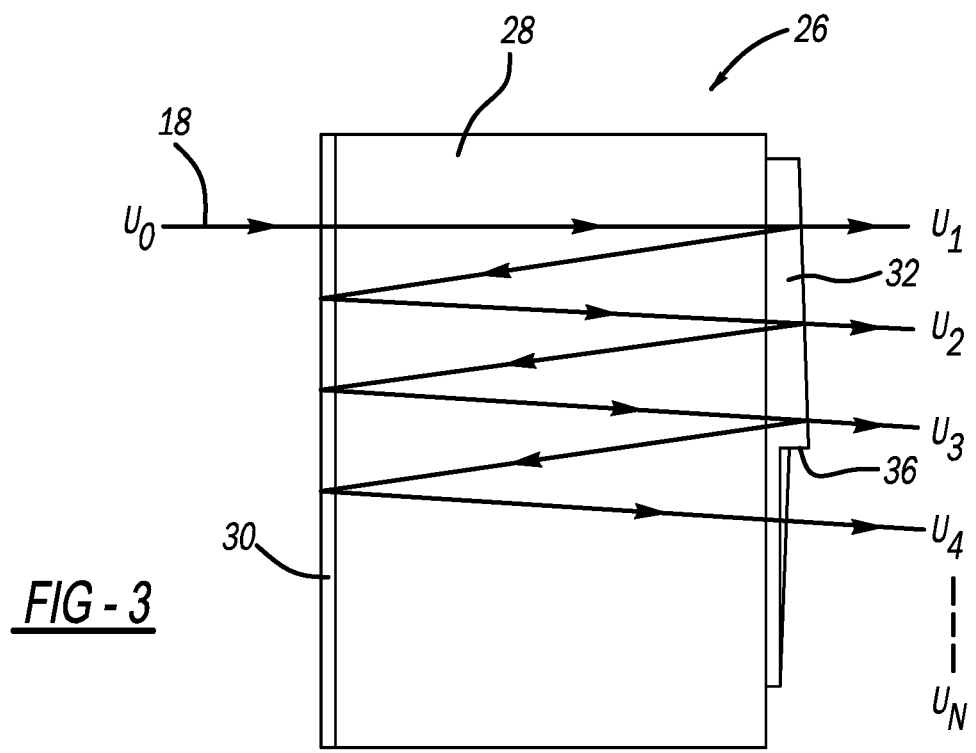
FIG. 3 is an side view of the SPPR device showing a beam being reflected therein.

The single mode beam 18 that propagates through the optical isolator 20 is sent to an SPPR device 26, where it is reflected back and forth in the device 26 as a result of its finite reflectivity. FIG. 2 is an isometric view and FIG. 3 is a side view of the device 26 separated from the system 10, where FIG. 3 shows the laser beam 18 being reflected back and forth within the device 26. The device 26 includes an optically transparent block 28, such as glass, having a reflective plate 30, such as a smooth reflective material coating, on an input side of the block 28 that is optically transmissive enough to allow the beam 18 from the collimator 16 to propagate therethrough. The device 26 also includes a step-wise spiral reflector 32, such as a polymer layer having a reflective material coating, with an azimuthally varying step 36 having height Δh on an output side of the block 28 that is also optically transmissive enough so that an output beam can propagate therethrough and be output from the device 26. Although smooth reflective material coatings are employed in this design to provide reflective surfaces on the block 28, in alternate designs nanoscale structures can be used to provide the reflectivity of the beam 18 in the block 28.

If the beam 18 propagated through the block 28 with no surface reflectivity, an optical vortex beam with a well-defined winding number would be produced on the output plane of the device 26, where the device 26 would act as a spiral phase plate. By providing finite reflectivity on opposing surfaces of the device 26 and providing the reflector 32 having the gradually varying azimuthal thickness, the device 26 operates as a spiral phase plate resonator, where an optical vortex beam 34 is output from the device 26 as a coherent superposition of optical vortices separated by specific positive winding numbers. In other words, each reflection of the beam 18 within the device 26 creates an individual optical vortex beam having a unique phase that is output from the device 26, shown as beams $U_1$-$U_N$, each having a different winding number, i.e., orbital angular momentum, where the beam 34 is a superposition of all of the optical vortex beams $U_1$-$U_N$ with different winding numbers having different orbital angular momentum states, and is referred to herein as an optical vortex intensity pattern. The optical vortex intensity pattern is thus a periodic intensity interference pattern based on the phase of the beams $U_1$-$U_N$ that varies as a function of the roll angle of the beam 34, where the rotation of the intensity pattern is controlled by the frequency of the beam 18.

The transmission T of a low to mid-range reflectivity device as a function of azimuthal angle φ is given as:

$$T[\phi] = \left|\sum_{N=1}^{\infty} U_N\right|^2 = \frac{A_0}{1 + \frac{4|r_2|^2}{(1-|r_1|^2)^2} \sin^2\left(\frac{\beta(\phi+\phi_0)}{2}\right)}, \quad (1)$$

where $U_N$ is the nth wave amplitude of the reflect beam in the block 28, where a coherent superposition of all the amplitudes on the output plane of the SPPR device 26 gives the transmission function, $A_0$ is the peak value of the beam transmission function, $r_2$ is the Fresnel reflection coefficient at the surfaces of the device 26, β is the number of intensity peaks in the beam 34 and quantifies the phase difference between the individual orbital angular momentum states (winding number) in the beams $U_1$-$U_N$, and $\phi_0$ is the angular position of the intensity peaks of the beam 34.

The dependence of the rotation angle δφ of the beam 34 as a function of the laser parameters and SPPR device parameters for an integer β device is given as:

$$\delta\phi = 2\pi \frac{h_0}{\Delta h} \frac{\delta v}{v}, \quad (2)$$

where δv is the change in frequency of the laser beam 18, v is the center frequency of the laser beam 18, Δh is the azimuthal step height of the spiral reflector 32, and $h_0$ is the height of the block 28.

Equation (2) assumes that Δh<<$h_0$, which is typical for most SPP designs, and assumes that the block 28 has a uniform refractive index. Thus, equation (2) shows that each incremental frequency value of the beam 18 corresponds to an incremental angle. Suitable non-limiting examples of optical system design parameters include λ=1.5 μm (center wavelength of light to give v=199.86 THz), β=5.55, Δh=2.67 μm, $h_0$=6 mm, and $r_2$=0.73 (reflection coefficient to give a reflectivity of R=|$r_2$|²=0.53).

As mentioned, the beam 34 is a coherent superposition of optical vortices, which has an angular intensity modulation as a function of roll angle. A precise rotation of the optical vortices in the beam 34 can be controlled by precisely changing the frequency of the beam 18 entering the SPPR device 26 by tuning the laser source 12 or changing the length of the SPPR device cavity. A beam splitter 46 splits the beam 34 into a reference beam 48 that is used for calibration purposes, and a measurement beam 50 that is used to determine the angle between fiducial lines on an element 42 having a static surface or rotating surface. An imaging lens 40 projects an output plane of the device 26 onto the element 42 by the measurement beam 50 and on a charge coupled device (CCD) camera 54 by the reference beam 48, which operates to calibrate the rotation of the vortices in the beam 34 as a function of the wavelength of the beam 18 for an accurate measurement of roll angle. A fast CCD detector or high speed single pixel detector 56 detects light reflected from the element 42 and generates electrical signals identifying the optical vortex intensity pattern projected onto the element 42. The signals from the detector 56 are sent to a processor 58 where they are processed in real time to determine the roll angle between fiducial lines on the element 42 as described herein.

As mentioned, the imaging lens 40 images the optical mode of the beam 34 immediately after the SPPR device 26. The focal length of the lens 40 can be controlled to vary the vortex core size of the optical vortex intensity pattern so that it is better suited for the curvature and configuration of the element 42. This is illustrated by projected images 60, 62 and 64 of the optical vortex intensity pattern in the measurement beam 50 at different propagation distances from the lens 40 towards the element 42. The images 60, 62 and 64 show an interference pattern 66 caused by the constructive and destructive interference of the beams $U_1$-$U_N$ having different phases and includes spaced apart peak radial intensity lines 68 radiating from a vortex core 70, where the size of the core 70 increases the farther the images 60, 62 and 64 are from the lens 40. Likewise, projected images 72, 74 and 76 of the optical vortex intensity pattern in the reference beam 48 are shown at different propagation distances from the lens 40 towards the CCD camera 54. In this illustration, the images 64 and 76 are the optical vortex intensity pattern in the diffraction far field and the images 60, 62, 72 and 74 are the optical vortex intensity pattern in the diffraction near field.

Typically the best roll angle measurements would be provided by a smallest core size. When the imaging lens 40 is set-up to maintain the size of the optical vortex core 70 to be small, the distance from the SPPR device 26 to the lens 40 and the distance from the lens 40 to the element 42 would each be two focal lengths. Other imaging configurations could be used such as a four focal length imaging system. Alternately, to increase the vortex core size, the distance to the element 42 where the angle is being measured, or the distance between the SPPR device 26 and the imaging lens 40 could be increased.

The optical system 10 can be scaled to smaller sizes through microfabrication of select optical components on a single platform, such as silicon or silica, and other elements of the system 10 could be fused to the platform. The largest components are expected to be the CCD detectors and laser source.

Figure 4:
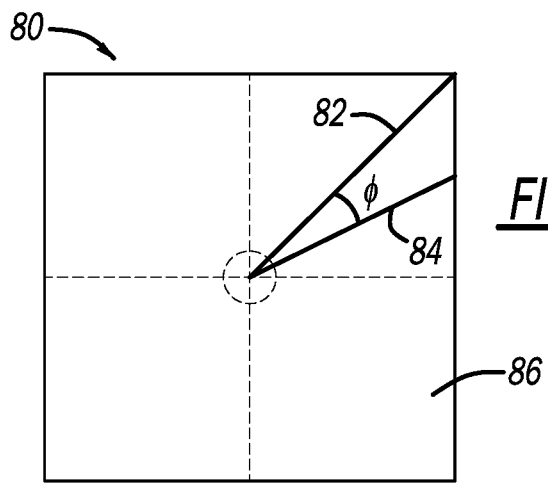
FIGS. 4-7 are a series of images showing a beam being projected onto a static surface for measuring roll angle.
Figure 5:
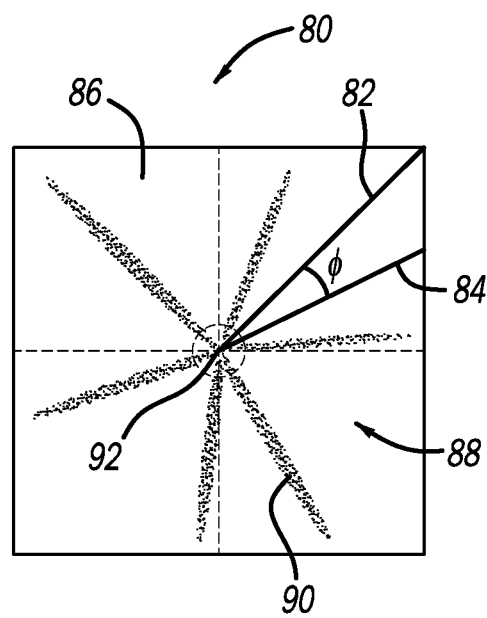
Figure 6:
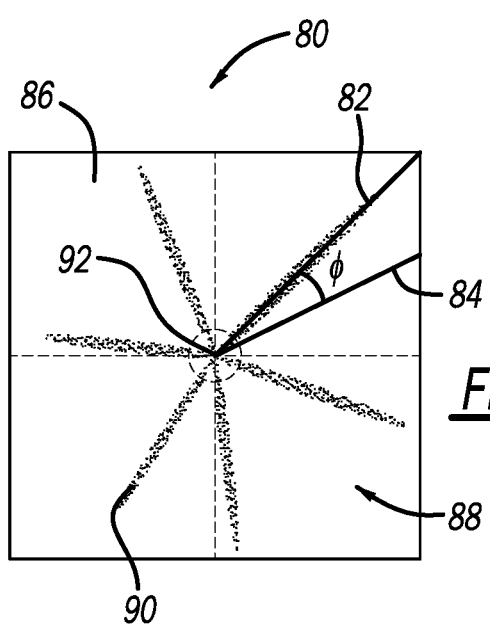
Figure 7:
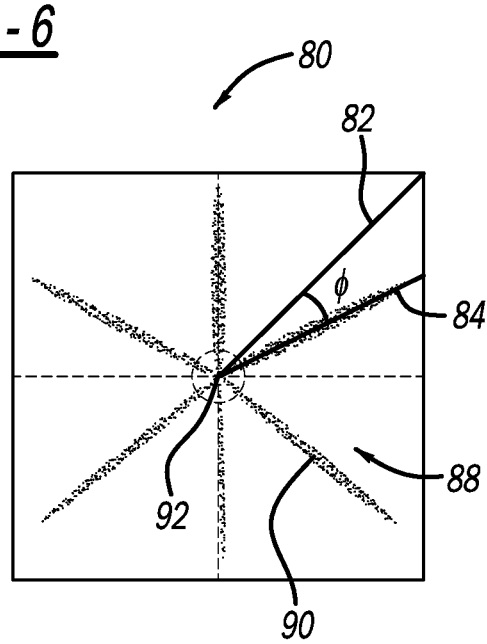

FIGS. 4-7 show a series of images 80 that illustrate how the system 10 determines an angle φ between a first fiducial line 82 and a second fiducial line 84 formed on a static surface 86 representing the element 42, as shown in FIG. 4, where the first line 82 represents a starting point of the angle measurement and the second line 84 represents an ending point of the angle measurement. First, the laser beam 18 is stabilized using standard laser locking techniques, such as phase locking and/or amplitude locking schemes. After the beam 34 has acquired an angular intensity modulation by the SPPR device 26, the image of the beam 34 is projected onto the surface 86 and is detected by the detector 56, where the image has an optical vortex interference pattern 88 including peak radial intensity lines 90 radiating from a center vortex core 92, and where the vortex core 92 is aligned with the center of the surface 86, as shown in FIG. 5. Initially, the first line 82 will usually not line up with any of the peak intensity lines 90. The frequency of the beam 18 is then changed until one of the intensity lines 90 does line up with the first line 82, as shown in FIG. 6, and that frequency is recorded. The frequency of the beam 18 is changed again until the same intensity line 90 rotates to the second line 84, as shown in FIG. 7, and that frequency is recorded. The difference between the two recorded frequencies is converted to an angle, which is the measurement of the angle φ between the lines 82 and 84. As described above with reference to equation (2), each incremental frequency value corresponds to an incremental angle. Hence, the angle between any two fiducials can be determined using an optical vortex interference pattern.

Image processing algorithms in the processor 58 can be used to determine the center of the optical vortex, position of the intensity peak lines 90, and the rotation of the optical vortex to high precision and accuracy. While only one intensity peak lines 90 is aligned with the fiducial lines 82 and 84 and rotated during the measurement, all of the intensity peak lines 90 are simultaneously making position measurements, and thus the precision of the measurement is substantially increased.

Figure 8:
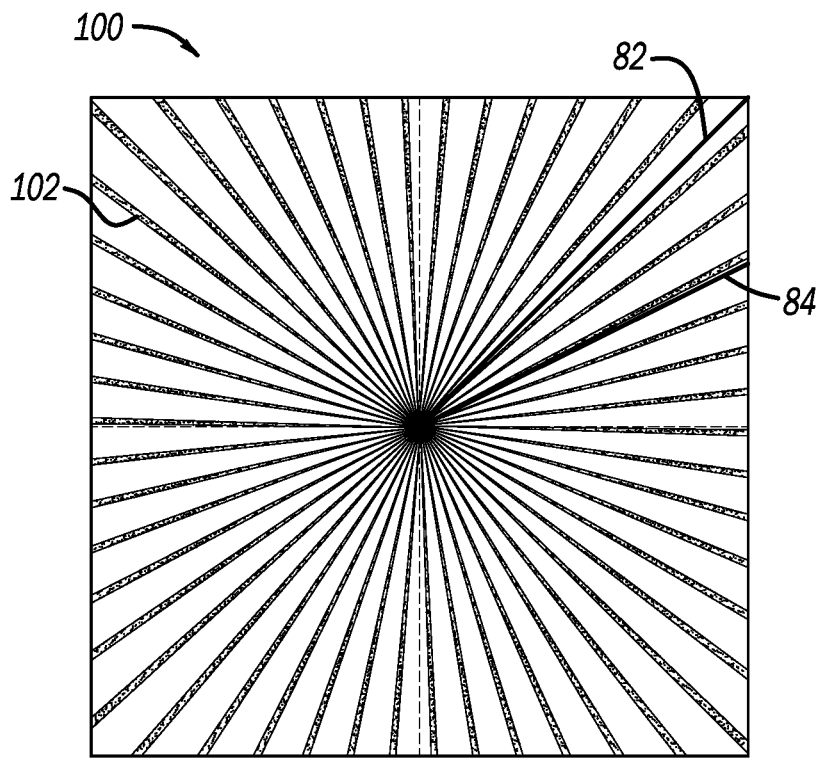
FIG. 8 is an image showing a beam being projected onto a static surface for measuring roll angle, where the beam includes fifty peak radial intensity lines.
Figure 9:
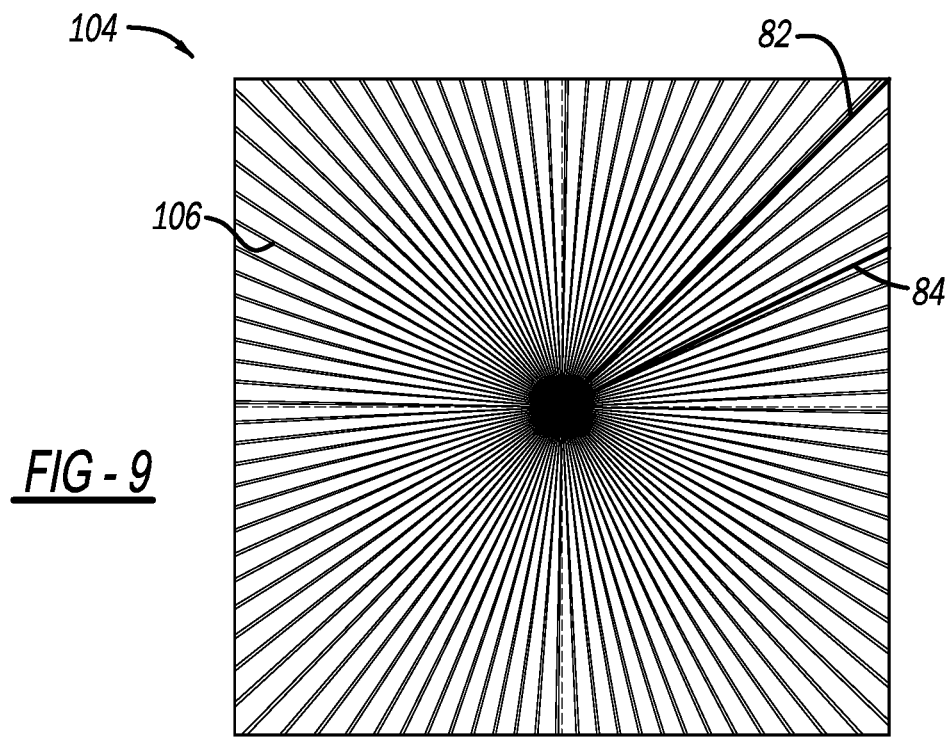
FIG. 9 is an image showing a beam being projected onto a static surface for measuring roll angle, where the beam includes one hundred peak radial intensity lines.

In an alternative design, the number of the intensity peak lines 90 in the interference pattern 88 could be could be increased such that there is significantly more than six intensity peaks in a $2\pi$ rad angle. For example, FIG. 8 is an image 100 including an optical vortex pattern having fifty peak intensity lines 102, i.e., an angular spacing between the ticks of $2\pi/50$, and FIG. 9 is an image 100 including an optical vortex pattern having one hundred peak intensity lines 104, i.e., an angular spacing between the ticks of $2\pi/100$. A computer algorithm could then be used to count the number of optical "angular" ticks between the fiducial lines 82 and 84 to determine the angle therebetween. However, in this case, the Rayleigh limit is reached much quicker for a beam that is the same size as the beam used in the current design. Thus, the resolution in the angle measurement is limited for the alternative approach. The roll angle determination process discussed herein is not fundamentally limited to the Rayleigh limit as it is angular displacements through a variation in the laser frequency that is used to determine the angle of interest. It is noted that a large number of angular intensity peaks can be made to rotate in order to measure the angle as in equation (2). Probable causes of errors in the measurement readings for the process discussed herein include thermal effects in the optical system as well as vibrations of the optical system. This is addressed by appropriate system calibration which is discussed below.

To ensure accurate measurements of the angles by conversion of frequencies, reference frequency measurements are simultaneously performed using the CCD camera 54 and compared with frequency measurements from the element 42 as discussed. The same process is employed where the first and second fiducial lines 82 and 84 are projected on the camera 54, an intensity peak line 90 in the optical vortex interference pattern 88 is aligned with the first fiducial line 82 and the frequency is recorded. The frequency of the beam 18 is changed until the intensity peak line 90 rotates to the second fiducial line 84, and that frequency is recorded, and the difference between the frequencies is converted to an angle that is compared with the angle obtained by the measurement of the surface 86. Because the rotation angle of the beams 48 and 50 would have the same value, the angle determined by the CCD camera 54 should provide the same frequency shifts as the measurements of the fiducial lines 82 and 84 on the surface 86. Hence, the camera 54 serves as a secondary verification for accurate angle measurement even after each incremental change in angle has been calibrated to an incremental change in wavelength to give the system calibration function.

The system 10 is calibrated in the same manner discussed above using the camera 54 for an accurate determination of the angle between two fiducials. From this measurement, a transfer function that effectively defines the calibration function of the optical system 10 is obtained. The transfer function converts a change in laser frequency to a change in angle, even in the presence of thermal effects of the elements in the optical system 10. Ideally, materials with a low coefficient of thermal expansion would be used in the optical system 10 for high precision measurements. Nevertheless, the CCD camera 54 updates from the calibration process before or during measurements enables angle determination on a static surface, even in the presence of thermal effects and vibrations. For measurements performed after the focus of the beam 34, the Gouy phase will cause an additional shift in the rotation of the optical beam 34. This effect is easily taken into account during the calibration of the optical system 10.

The discussion above provides an angle measurement between two fiducial lines on the element 42 when it is static, i.e. not rotating, by changing the frequency of the beam 18 as described. However, the optical system 10 can also measure the angle between two fiducial lines on the element 42 when the element 42 is rotating and the rotation rate of the element 42 can also be determined. In this embodiment, the detector 56 detects back scattered light to first determine the rotation rate of the element 42. The signals received by the processor 58 from the detector 56 are processed to identify a power spectrum $f_{mod}$ of the light by taking a Fourier Transform of a time domain signal to provide a frequency domain signal to obtain a frequency modulation of the scattered light. If the frequency modulation of the detected scattered light provided by the power spectrum $f_{mod}$ and a phase difference between two optical vortex states $\Phi$ in the measurement beam 50 are known, then the rotation rate $\Omega_{rot}$ of a rotating surface as a result of the rotational Doppler effect can be determined as:

$$\Omega_{rot} = \frac{2\pi f_{mod}}{\Phi}. \quad (3)$$

In previous studies utilizing the rotational Doppler shift as a sensor, the value $\Phi$ was deduced with optical vortex states with opposite handedness such as creating a coherent superposition of optical vortices with winding numbers $l_1=1$ and $l_2=-1$ to give $\Phi=|l_1-l_2|=2l$.

As discussed above, the beam 34 from the SPPR device 26 contains a coherent superposition of optical vortex states $\Phi$, all of which have positive winding numbers. The value $\beta$ in equation (1) is a parameter that quantifies the difference in phase between the individual winding numbers of the optical vortices in the beam 34 from the SPPR device 26. Hence, the expression in equation (3) for determining the rotation rate $\Omega_{rot}$ can be converted to:

$$\Omega_{rot} = \frac{2\pi f_{mod}}{\beta}. \quad (4)$$

From the discussion above, the rotation rate of the element 42 and the angle between fiducial lines on the element 42 can be determined as follows. Scattered light from the element 42 is detected by the detector 56, and processed by the processor 58 to obtain the power spectrum $f_{mod}$. Providing $f_{mod}$ in equation (4) with the already known value $\beta$ for the specific SPPR device design gives the rotation rate $\Omega_{rot}$ of the element 42. Multiplying the rotation rate $\Omega_{rot}$ of the element 42 and the time elapsed $T_e$ during which the rotation rate is determined gives the roll angle $\phi$ between the fiducial lines, i.e., $\phi=\Omega_{rot}T_e$.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical system for measuring a roll angle between two points on an element, said system comprising:
a tunable laser source generating a laser beam;
a spiral phase plate resonator (SPPR) device responsive to the laser beam, said SPPR device including opposing reflective surfaces that reflect the laser beam back and forth in the device, wherein one of the reflective surfaces includes a spiral step index that causes multiple reflected beams having different phases to be combined as an output beam from the device having an optical vortex intensity pattern defined by the phases of the multiple beams, where the intensity pattern includes a core and radial light intensity lines from the core; and
a lens projecting the output beam onto the element that is detectable to determine the roll angle.

2. The optical system according to claim 1 further comprising a detector for detecting light reflected from the element and a processor responsive to signals from the detector identifying the detected light, said processor generating images from the signals that include the optical vortex intensity pattern projected onto the element, said processor causing the laser source to change the frequency of the laser beam so that one of the intensity lines aligns with a first one of the points and then causing the laser source to again change the frequency of the laser beam so that the one intensity line aligns with a second one of the points, where a difference between the frequencies of the laser beam is used to determine the angle between the points.

3. The optical system according to claim 2 wherein the processor determines the roll angle using the equation:

$$\delta\phi = 2\pi \frac{h_0}{\Delta h} \frac{\delta v}{v},$$

where $\phi$ is the roll angle, $\delta v$ is a change in frequency of the laser beam, $v$ is a center frequency of the laser beam, $\Delta h$ is an azimuthal step height of the spiral step index reflective surface, and $h_0$ is a height of the SPPR device.

4. The optical system according to claim 1 wherein the element is rotating, said optical system further comprising a detector for detecting light reflected from the element and a processor responsive to signals from the detector identifying the detected light, said processor calculating a power spectrum from the reflected light and determining a rotation rate of the element from the power spectrum using a rotational Doppler effect.

5. The optical system according to claim 4 wherein the processor determines the rotation rate of the element using the equation:

$$\Omega_{rot} = \frac{2\pi f_{mod}}{\beta},$$

where $\Omega_{rot}$ is the rotation rate, $f_{mod}$ is the power spectrum, and $\beta$ is a number of the intensity lines.

6. The optical system according to claim 4 wherein the processor determines the roll angle between the points by multiplying the rotation rate by a time that the rotation rate was determined.

7. The optical system according to claim 1 further comprising a beam splitter that splits the beam from the SPPR device into a measurement beam and reference beam, said measurement beam being projected onto the element and said reference beam being projected onto a calibration detector for generating a calibration roll angle measurement.

8. The optical system according to claim 7 wherein the calibration detector is a CCD camera.

9. The optical system according to claim 1 wherein the element is positioned at a distance from the lens of two focal lengths of the lens.

10. The optical system according to claim 1 further comprising an optical component responsive to and converting the laser beam to a single mode laser beam before the laser beam is sent to the SPPR device.

11. The optical system according to claim 10 wherein the optical component is a single mode fiber.

12. The optical system according to claim 10 wherein the optical component is an aperture.

13. The optical system according to claim 1 wherein the element is an aerospace component.

14. The optical system according to claim 1 wherein the two points are fiducial lines on the element.

15. An optical system for measuring a roll angle between two points on an element, said system comprising:
   a tunable laser source generating a laser beam;
   an optical component responsive to and converting the laser beam to a single mode laser beam;
   a spiral phase plate resonator (SPPR) device responsive to the single mode laser beam, said SPPR device including opposing reflective surfaces that reflect the laser beam back and forth in the device, wherein one of the reflective surfaces includes a spiral step index that causes multiple reflected beams having different phases to be combined as an output beam from the device having an optical vortex intensity pattern defined by the phases of the multiple beams, where the intensity pattern includes a core and radial light intensity lines from the core; and
   a lens projecting the output beam onto the element;
   a measurement detector for detecting light reflected from the element; and
   a processor responsive to signals from the detector identifying the detected light, said processor generating images from the signals that include the optical vortex intensity pattern projected onto the element, said processor causing the laser source to change the frequency of the laser beam so that one of the intensity lines aligns with a first one of the points and then causing the laser source to again change the frequency of the laser beam so that the one intensity line aligns with a second one of the points, where a difference between the frequencies of the laser beam is used to determine the angle between the points.

16. The optical system according to claim 15 further comprising a beam splitter that splits the beam from the SPPR device into a measurement beam and reference beam, said measurement beam being projected onto the element and said reference beam being projected onto a calibration detector for generating a calibration roll angle measurement.

17. An optical system for measuring a rotation rate and roll angle of a rotating element, said system comprising:
   a tunable laser source generating a laser beam;
   an optical component responsive to and converting the laser beam to a single mode laser beam;
   a spiral phase plate resonator (SPPR) device responsive to the single mode laser beam, said SPPR device including opposing reflective surfaces that reflect the laser beam back and forth in the device, wherein one of the reflective surfaces includes a spiral step index that causes multiple reflected beams having different phases to be combined as an output beam from the device having an optical vortex intensity pattern defined by the phases of the multiple beams, where the intensity pattern includes a core and radial light intensity lines from the core; and
   a lens projecting the output beam onto the element;
   a measurement detector for detecting light reflected from the element; and
   a processor responsive to signals from the detector identifying the detected light, said processor calculating a power spectrum from the reflected light, determining a rotation rate of the element from the power spectrum using a rotational Doppler effect, and determining the roll angle between the points by multiplying the rotation rate by a time that the rotation rate was determined.

18. The optical system according to claim 17 further comprising a beam splitter that splits the beam from the SPPR device into a measurement beam and reference beam, said measurement beam being projected onto the element and said reference beam being projected onto a calibration detector for generating a calibration roll angle measurement.

19. A spiral phase plate resonator (SPPR) device responsive to the laser beam, said SPPR device including opposing reflective surfaces that reflect the laser beam back and forth in the device, wherein one of the reflective surfaces includes a spiral step index that causes multiple reflected beams having different phases to be combined as an output beam from the device having an optical vortex intensity pattern defined by the phases of the multiple beams, where the intensity pattern includes a core and radial light intensity lines from the core.

20. The SPPR device according to claim 19 wherein the SPPR device is part of an optical protractor that measures a roll angle between two points.

* * * * *